United States Patent Office 3,682,853
Patented Aug. 8, 1972

3,682,853
LIQUID STABILIZERS FOR VINYL
CHLORIDE RESINS
Walter P. Barie, Jr., Shaler Township, Norman W. Franke, Penn Hills Township, and Gary M. Singerman, Borough of Monroeville, Allegheny County, Pa., assignors to Gulf Research & Development Company, Pittsburgh, Pa.
No Drawing. Filed Oct. 1, 1970, Ser. No. 77,363
Int. Cl. C08f 29/18, 45/62
U.S. Cl. 260—23 XA                  7 Claims

ABSTRACT OF THE DISCLOSURE

The stabilization of polyvinyl chloride resins and polyvinyl chloride resin compositions with novel storage-stable liquid compositions comprising metal salts of linear aliphatic monocarboxylic acids, a triorganophosphite, a carboxylic acid anhydride, a carboxylic acid and a hydrocarbon solvent.

This invention relates to novel storage-stable liquid compositions which may be employed in the stabilization of polyvinyl chloride resins and polyvinyl chloride resin compositions and it further relates to the stabilized resins. More particularly this invention relates to new storage-stable liquid stabilizer compositions for polyvinyl chloride resins and polyvinyl chloride resin compositions comprising various combinations of the barium, cadmium and/or zinc salts of linear aliphatic monocarboxylic acids, a triorganophosphite, a carboxylic acid anhydride, a carboxylic acid and a hydrocarbon solvent, all of which are defined and exemplified hereinbelow.

Halogen-containing polymers, such as polyvinyl chloride homopolymers and copolymers, are useful because of their desirable physical properties. In many cases, however, such resins are susceptible to discoloration due to heat degradation. This is especially troublesome in the course of compounding these resins at elevated temperatures and during long heating, as in milling, thus limiting the use of such resins until various stabilizing materials and compositions were developed which would protect against such degradation and discoloration.

Many heat stabilizers are known to the art. Among the more important heat stabilizers in commercial use are mild alkalis such as sodium carbonate, disodium phosphate, and sodium and potassium salts of partially esterified phosphoric acids; inorganic and organic lead salts; organotin carboxylates, organotin mercaptides; various metal-free organic compounds such as soybean oil epoxide, isooctyl epoxystearate and the diglycidyl ether of 2,2-bis-(p-hydroxyphenyl)propane. For detailed discussion of heat stabilizers for vinyl halide resins, reference may be made to the articles by N. L. Perry "Barium-Cadmium Stabilization of Polyvinyl Chloride," Rubber Age 85, pp. 449 to 452 (June 1959) and by H. Verity-Smith, British Plastics 27, pp. 176 to 179, 213 to 217, 307 to 311 (1954).

During the compounding of polyvinyl chloride resin compositions it is often advantageous to add the stabilizer material in a liquid rather than in a solid form. Most of the metallic stabilizer materials in current use, however, are in themselves solid materials and a continuing interest exists in developing systems which may be used to dissolve these solids and which will keep them in solution for long periods of time without precipitation. Toward this end, limited success has been achieved by other workers in the field who have prepared a few storage-stable liquid compositions wherein the solvent is a polar liquid such as an alcohol, for example, isooctyl alcohol, an ester such as dioctyl phthalate, an organic carboxylic acid in conjunction with an alkylene glycol such as 2-hexoxyethanol, or any combination of these solvents or like polar liquids. The non-polar hydrocarbon solvents, which are defined hereinbelow and which are more readily available and less expensive than the polar solvents just mentioned, are not generally used in liquid metallic-salt stabilizer compositions because the salts used in these compositions are not sufficiently soluble in these hydrocarbon solvents. Furthermore, the heavy metal salts used in previous liquid stabilizer compositions are generally a barium, cadmium and/or zinc salt of a branched-chain acid such as 2-ethylhexanoic acid or an alkylphenol such as nonylphenol, or a combination of these types, because these may be easily dissolved in the polar solvents mentioned hereinabove. Metal salts of the linear aliphatic monocarboxylic acids such as octanoic acid are less readily soluble, or are substantially insoluble, in these polar liquids and are likewise either insoluble or lack solution stability in hydrocarbon solvents. Even so, it is well known that the barium, cadmium and zinc salts of the linear aliphatic monocarboxylic acids are excellent polyvinyl chloride resin stabilizers and that it would often be advantageous to use them in liquid form if such a form were available. We have ascertained that these salts of the linear aliphatic monocarboxylic acids are superior stabilizers in comparison with the corresponding branched chain acid salts.

Unexpectedly, we have found that storage-stable solutions of a barium salt of a linear aliphatic carboxylic acid, for example nonanoic acid, a cadmium salt of this same type of acid, or a zinc salt of this same type of acid, or any combination of these salts in a hydrocarbon solvent may be obtained providing that the solution also contains a triorganophosphite, for example triphenyl phosphite, an organic carboxylic acid, for example octanoic acid, and an organic acid anhydride such as propionic anhydride. All three of these materials must be present as additives in the metal salt-hydrocarbon solvent mixture for a storage-stable liquid composition to result. None of these three, when acting alone, nor any two alone, will cause dissolution of the metal salt into the hydrocarbon solvent to give a storage-stable liquid composition.

Accordingly, it is an object of the instant invention to provide liquid storage-stable compositions which are useful in stabilizing polyvinyl chloride resins and polyvinyl chloride resin compositions against thermal degradation and discoloration comprising the barium, cadmium or zinc salts of linear aliphatic monocarboxylic acids, or any combination of these, a liquid hydrocarbon solvent, a triorganophosphite, an organic carboxylic acid and an organic carboxylic acid anhydride and to provide resins stabilized therewith, all of which are defined and exemplified hereinbelow.

The polymers which may be heat-stabilized in accordance with this invention may typically be those which contain chlorine atoms bonded to the polymer chain. These polymers may be homopolymers including polyvinyl chloride-type polymers, e.g. polyvinyl chloride, polyvinylidene chloride, etc. They may also include copolymers formed by the copolymerization of vinyl chloride or vinylidene chloride with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. These polymers are herein called polyvinyl chloride polymers for convenience.

The vinyl chloride polymers can also contain plasticizers such as dioctyl phthalate; lubricating agents such as stearic acid; pigments; fillers, etc. A total of from 0.5 to 10 parts by weight of the combined stabilizer combination of the invention, excluding the hydrocarbon solvent, can be used for each 100 parts by weight of the resin. More stabilizer composition can be used, but usually no better result is obtained, and therefore such amounts are uneconomical and wasteful. Less stabilizer can be used but it is not likely to accomplish the desired degree of stabilization.

The barium, cadmium and zinc salts of the linear aliphatic monocarboxylic acids which may be employed in the practice of this invention may be the salts derived from the linear aliphatic monocarboxylic acids having from six to 12 carbon atoms inclusive, specifically hexanoic, heptanoic, octanoic, nonanoic, decanoic, undecanoic and lauric acids or any combination of these acids. Any one of the barium, cadmium, or zinc salts of these acids or mixtures of these acids may be used alone, or any combination of two, or all three salts may be used together with the remaining components of the liquid stabilizer compositions described herein according to the needs of the user. It is preferred that all of the metal salt in the composition be the linear aliphatic acid salt since it is a superior stabilizer, however, some of the stabilizer salt can comprise an inferior stabilizer such as a metal salt of a branched chain acid. Also salts of an alkylphenol such as nonylphenol or octylphenol can also comprise a portion of the metal salt stabilizer component.

The triorganophosphites which are employed in the practice of this invention are represented by the formula

wherein $R_1$, $R_2$, and $R_3$ are independently selected from organic radicals having from about one to about 18 carbon atoms and preferably from one to about 10 carbon atoms selected from aryl including alkyl substituted aryl, alkyl including aryl substituted alkyl, cycloaliphatic, and oxygen-carbon heterocyclic groups. Exemplary are triphenyl phosphite, tricresyl phosphite, tri(dimethylphenyl) phosphite, tri-n-butyl phosphite, dimethyl stearyl phosphite, triisooctyl phosphite, tridodecyl phosphite, diisoactyl phenyl phosphite, isooctyl diphenyl phosphite, tri (p-t-octylphenyl)phosphite, tri(p - t - nonylphenyl)phosphite, tri(p - t-nonyl-o-cresyl)phosphite, tribenzyl phosphite, isobutyl dicresyl phosphite, isooctyl di(p-t-octylphenyl)phosphite, tri(2 - ethylhexyl)phosphite, tri(2-cyclohexylphenyl)phosphite, tri-alpha-naphthyl phosphite, tri(diphenyl)phosphite, tri(2 - phenylethyl)phosphite, trifuryl phosphite, tritetrahydrofurfuryl phosphite, tricyclohexyl phosphite and tricyclopentyl phosphite.

The novel composition of this invention includes an organic carboxylic acid. The aliphatic, aromatic, alicyclic and oxygen-containing heterocyclic organic acids are operable as a class. By the term "aliphatic acid" is meant any open chain carboxylic acid, substituted, if desired, with non-reactive groups such as halogen, sulfur and hydroxyl. By the term "alicyclic" it will be understood that there is intended any cyclic acid in which the ring is non-aromatic and composed solely of carbon atoms, and such acids may have, if desired, inert non-reactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups and other saturated or aromatic rings condensed therewith.

As exemplary of the acids which can be used, there can be mentioned the following: acetic acid, propionic acid, hexanoic acid, 2-ethylhexanoic acid, octanoic acid, isooctanoic acid, capric acid, nonanoic acid, 3,5,5-trimethylhexanoic acid, undecylic acid, lauric acid, myristic acid, palmitic acid, oleic acid, chlorocaproic acid, hydroxycaproic acid, ethylacetoacetic acid, ethylbenzoic acid, phenylacetic acid, butylbenzoic acid, hexylbenzoic acid, salicyclic acid, naphthenic acids derived from petroleum, hexahydrobenzoic acid and methylfuroic acid, as well as partially esterified dibasic acids such as monobutyl phthalate, isooctyl maleate, and ethylene glycol maleate. Polycarboxylic acids typified by malonic acid, succinic acid, glutaric acid, adipic acid, pimelic acid, suberic acid, azelaic acid, sebacic acid, etc., can also be employed. Broadly the organic carboxylic acid contains from one to about 20 carbon atoms and preferably the organic carboxylic acid contains one carboxylic group and two to 12 carbon atoms, typically nine carbon atoms, such as nonanoic acid.

The organic acid anhydrides used in the process of the invention can be any anhydride which is derived by dimerization of a monocarboxylic acid with itself or with a second monocarboxylic acid, or it can be a monomeric acid anhydride which is derived from a polycarboxylic acid and possesses at least one anhydride group. The carboxylic acids used in the formation of the dimeric anhydrides can be saturated, unsaturated, aliphatic, cycloaliphatic, aromatic or heterocyclic and have from one to about 18 carbon atoms and preferably two to about nine carbon atoms. Examples of these anhydrides include acetic anhydride, propionic anhydride, hexanoic anhydride, 2-ethylhexanoic anhydride, octanoic anhydride, isooctanoic anhydride, capric anhydride, nonanoic anhydride, oleic anhydride, chlorocaproic anhydride, ethylbenzoic anhydride, hexylbenzoic anhydride, hexahydrobenzoic anhydride, methylfuroic anhydride, as well as anhydrides derived from partially esterified dibasic acids such as monobutyl phthalate and isooctyl maleate. The dimeric anhydrides as exemplified above may also be derived from two different monocarboxylic acids, for example the mixed dimeric anhydride derived from propionic acid and octanoic acid and the mixed anhydride derived from hexanoic acid and hexahydrobenzoic acid. Especially preferred are the normally liquid or low melting anhydrides having from about two to about nine carbon atoms.

The monomeric acid anhydrides used in the invention can be any anhydride which is derived from a polycarboxylic acid and possesses at least one anhydride group. The carboxylic acids used in the formation of the monomeric anhydrides can be saturated, unsaturated, aliphatic, cycloaliphatic, aromatic or heterocyclic and have from about three to about 20 carbon atoms and preferably about three to about 10 carbon atoms. They may also possess 1, 2, 3 or more cyclic anhydride groups. Examples of these include among others, phthalic anhydride, di-, tetra-, and hexahydrophthalic anhydride, 3,4,5,6,7,7-hexachloro - 3,6 - endomethylene - 1,2-tetrahydrophthalic anhydride (chlorendic anhydride), succinic anhydride, maleic anhydride, chlorosuccinic anhydride, monochloromaleic anhydride, 6 - ethyl - 4 - cyclohexadiene - 1,2-dicarboxylic acid anhydride, 6 - butyl - 3,5 - cyclohexadiene-1,2 - dicarboxylic acid anhydride, dioctyl succinic anhydride, adducts of maleic anhydride with polyunsaturates such as methylcyclopentadiene (methylbicyclo(2.2.1.) heptene - 2,3 - dicarboxylic anhydride), 3 - butoxy-1,2,3,6-tetrahydrophthalic anhydride, polyadipic acid anhydride, polysebacic acid anhydride, and the like and mixtures thereof. Derivatives of the anhydrides, such as their partial esters, etc., may also be employed. Examples of these include esters of glycols and partial esters of glycols of trimellitic anhydride.

Another type of monomeric anhydride which may be used to prepare the new compositions of this invention are substituted benzylsuccinic anhydrides. By a "substituted benzylsuccinic anhydride" is meant benzylsuccinic anhydride having substituents on the aromatic ring and the carbon atom in the alpha position to the aromatic ring, said substituents being selected from the group consisting of hydrogen, a halogen, an alkyl group having between one and six carbon atoms and an aryl group, and wherein no more than one of the substituents on the carbon atom alpha to the aromatic ring is an aryl group. The substituted benzylsuccinic anhydrides of this invention can be represented by the general formula:

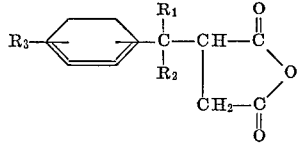

where $R_1$ and $R_3$ can be selected from the group consisting of hydrogen and an alkyl group having between one and six carbon atoms; and $R_2$ can be selected from the group consisting of hydrogen, an alkyl group having between one and six carbon atoms, an aryl group and a halogen. It is preferred that $R_1$ and $R_2$ be alkyl groups having between one and three carbon atoms and that $R_3$ be hydrogen. Examples of suitable substituted benzylsuccinic anhydrides include benzylsuccinic anhydride;

alpha,alpha-dimethylbenzylsuccinic anhydride;
alpha-methylbenzylsuccinic anhydride;
para-methyl-alpha,alpha-dimethylbenzylsuccinic anhydride;
meta-methyl-alpha,alpha-dimethylbenzylsuccinic anhydride;
para-t-butyl-alpha-methyl-alpha-phenylbenzylsuccinic anhydride;
para-t-butylbenzylsuccinic anhydride;
para-chloro-alpha,alpha-dimethylbenzylsuccinic anhydride; and
alpha-methyl-alpha-n-butylbenzylsuccinic anhydride. The most preferred anhydride of this type is alpha,alpha-dimethylbenzylsuccinic anhydride.

Another type of monomeric anhydride which may be used to prepare the new compositions of this invention are the polyanhydrides prepared by the copolymerization of maleic anhydride with monoolefins. The monoolefins are defined in United States Pat. No. 3,374,209 beginning at column 6, line 3 and extending to column 7, line 28, which disclosure is incorporated herein as a part of the present disclosure. The preferred monoolefin is an alpha-olefin represented by the following general formula:

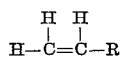

where R is hydrogen, halogen or a straight chain alkyl or halogenated alkyl radical having from one to about 18 carbon atoms.

It is understood that the term "olefin" is meant to include mixtures of monolefins. While only one olefinic bond per molecule is present in the olefin since more than one double bond per molecule promotes gel formation and internal cross-linking, minor amounts of diolefins, of the order of two percent or less, can be tolerated.

Examples of olefin compounds or mixtures of olefins which are preferred to form the polyanhydride components of the compositions include: 1-propene, 1-butene, 1-pentene, 1-hexene, 1-heptene, 1-octene, 1-nonene, 1-decene, 5-chlorohexene-1, 1-undecene, 1-dodecene, 1-tridecene, 1-tetradecene, 1-octadecene, and mixtures thereof, etc.

A general formula for the polyanhydride can be represented by the general formula:

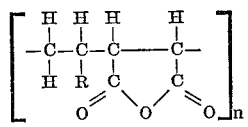

wherein $n$ is an integer of from two to about 100, R is hydrogen, halogen or a straight chain alkyl or halogenated alkyl group having from one to about 18 carbon atoms. A preferred polyanhydride of this type is a 1:1 copolymer of 1-decene and maleic anhydride which has an approximate molecular weight of 5,000 and thus contains 20 to 25 anhydride groups.

The hydrocarbons are a class of organic compounds which consist solely of the elements carbon and hydrogen. Those hydrocarbons which can be used in the practice of this invention include all of the hydrocarbons which are normally liquid at 20° C. or lower temperatures and which have a boiling point at atmospheric pressure of 50° C. and preferably higher. These are selected from the group consisting of paraffins, cycloparaffins, olefinic hydrocarbons, aromatic hydrocarbons and mixtures thereof. By the term "paraffins" is meant any open-chain, saturated hydrocarbon with the empirical formula $C_nH_{2n+2}$, for example hexane, dimethylpropylmethane, diethylmethylmethane, ethylisobutylmethane, heptane, methyldipropylmethane, octane, isooctane, 2,7-dimethyloctane, nonane, decane, dodecane, and the like. By the term "cycloparaffins" it will be understood there is intended any cyclic hydrocarbon in which the ring is nonaromatic and which may be substituted with alkyl radicals and/or other carbocyclic ring structures condensed therewith. As exemplary of such cycloparaffins which can be used there can be mentioned cyclohexane, hexahydrotoluene, ethylcyclohexane, hexahydro-m-xylene, hexahydro-p-xylene, hexahydrocumene, Decalin, p-menthane, methylcyclopentane, butyclclopentane, the naphthenes which are generally derivatives of cyclopentane and cyclohexane occurring in petroleuum of various origins, and the like and mixtures thereof. By the term "olefinic hydrocarbons" it will be understood that there is intended any hydrocarbon which is nonaromatic, which contains at least one double bond, and which may be open chained or cyclic or both. Exemplary are vinylcyclohexane, 1-decene, isooctene, 4-isopropyl-1-methyl-3-cyclohexene, and the like. By the term "aromatic hydrocarbon" is meant the usual aromatic and alkyl-substituted aromatic compounds typified by benzene, toluene, xylene, butylbenzene, cumene, phenylcyclohexane and the like. In the practice of the invention it is preferable that a petroleum fraction containing a mixture of the paraffins, cycloparaffins, olefinic, and aromatic hydrocarbons be used and that the olefinic and aromatic hydrocarbons represent a minor portion of the mixture. Such hydrocarbon mixtures include the mineral oils, kerosene, heavy naphthas, light naphthas, etc. Thus a very satisfactory hydrocarbon solvent consists of 68 percent paraffins, 1.5 percent olefins, 24 percent naphthenes and 6.5 percent aromatic hydrocarbons.

Such stabilizer compositions of the invention comprise from about four to about 40 parts of the metal salt of a linear aliphatic monocarboxylic acid when used alone or from about four to about 60 parts total of the metal salt when any two or three of these barium, cadmium or zinc salts are used in combination, from about 10 to about 80 parts of the triorganophosphite, from about one to about 35 parts of the carboxylic acid, from about one to about 35 parts of the carboxylic acid anhydride, and from about 15 to about 80 parts of the hydrocarbon solvent, the parts of each component being based on 100 parts of the total stabilizer composition. A total of from 0.5 to 10 parts by weight of the combined stabilizer combination of the invention, excluding the hydrocarbon solvent, can be used for each 100 parts by weight of the resin.

If desired, there can be added other materials to the composition for various purposes. For example, an alkylene glycol such as 2-butoxyethanol may be added to lower the viscosity of the liquid compositions or an epoxidized vegetable oil such as epoxy soybean oil may be included, if desired, as a secondary stabilizer, and the like. Moreover, the stabilizer compositions of the invention can be used also in combination with antioxidants, ultraviolet light absorbers, dyes, pigments, fillers, antistatic agents, plasticizers, and the like.

EXAMPLE 1

A mixture of 4.5 parts barium nonanoate, 8.9 parts paraffin oil, 6.7 parts isooctyl diphenyl phosphite, 1.0 part hexahydrophthalic anhydride and 1.0 part nonanoic acid was heated and stirred until the temperature of the mixture was 150°. A small amount of sediment was removed from the resulting solution by centrifugation to give a clear, homogeneous liquid which was stored in a closed glass bottle at room temperature. After one month, the sample remained as a clear liquid which was free of sediment. The paraffin oil used in this example was a white paraffin oil, also known as white mineral oil or liquid petrolatum. It is a mixture of liquid hydrocarbons having a boiling range of about 330° to 390°, and a Saybolt viscosity of 125/135.

EXAMPLE 2

A mixture of 1.0 part phthalic anhydride, 9.0 parts paraffin oil (described in Example 1) and 1.5 parts nonanoic acid was heated and stirred until a homogeneous solution was formed. Upon cooling, phthalic anhydride crystallized from solution. A mixture of 6.7 parts isooctyl diphenyl phosphite, 5.2 parts barium nonanoate, 3.2 parts cadmium nonanoate and 2.5 parts additional nonanoic acid was added and the whole was stirred and heated to 195°. A small amount of sediment was removed from the resulting solution by centrifugation to give a clear, homogeneous liquid which was stored in a closed glass bottle at room temperature. After one month, the sample remained as a clear liquid which was free of sediment.

EXAMPLE 3

A mixture of 5.2 parts barium nonanoate, 3.2 parts cadmium nonanoate, 6.7 parts isooctyl diphenyl phosphite, 8.9 parts naphtha, 1.0 part propionic anhydride and 1.0 part propionic acid was heated and stirred until it began boiling and until the temperature of the solution reached 135°. An amount of naphtha corresponding to that which had been lost by boiling was added to the resulting solution. A small amount of sediment was removed by centrifugation to yield a clear, homogeneous liquid which, after one month of storage, remained clear, liquid, and free of sediment. The naphtha used in this experiment is known as Varnish Makers' and Painters' naphtha. It has a distillation range of about 119° to 143° and an approximate composition of 45 percent naphthenes (cycloparaffin hydrocarbons), 47 percent paraffins and 8 percent aromatic hydrocarbons.

EXAMPLE 4

A mixture of 3.5 parts barium nonanoate, 3.0 parts cadmium nonanoate, 1.5 parts zinc nonanoate, 6.7 parts isooctyl diphenyl phosphite, 8.9 parts paraffin oil (described in Example 1), 1.0 part propionic anhydride and 1.5 parts octanoic acid was stirred and heated until a temperature of 130° was obtained. A small amount of sediment was removed from the resulting solution by centrifugation to give a clear, homogeneous liquid which, after one month of storage at room temperature, remained as a clear liquid which was free of sediment.

EXAMPLE 5

A mixture of 5.2 parts of the coprecipitated barium salt of octanoic and nonanoic acids (from a 1:1 molar mixture of octanoic and nonanoic acids) 3.2 parts of the coprecipitated cadmium salt of octanoic and nonanoic acids (from a 1:1 molar mixture of octanoic and nonanoic acids), 6.7 parts isooctyl diphenyl phosphite, 8.9 parts naphtha (described in Example 3), 1.0 part propionic anhydride and 1.0 part nonanoic acid was stirred and heated to a temperature of 150°, replacing naphtha as it was lost by boiling. A small amount of sediment was removed from the resulting solution by centrifugation to give a clear, homogeneous liquid which, after one month of storage at room temperature, remained as a clear liquid which was free of sediment.

EXAMPLE 6

A mixture of 5.2 parts of the barium salt described in Example 5, 3.2 parts of the cadmium salt described in Example 5, 6.7 parts isooctyl diphenyl phosphite, 6.9 parts naphtha (described in Example 3), 1.0 part methylbicyclo (2.2.1)heptene-2,3-dicarboxylic anhydride (nadic methyl anhydride), and 2.0 parts nonanoic acid was stirred and heated to a temperature of 155°. An amount of naphtha corresponding to that which had been lost by boiling was added to the resulting solution. A small amount of sediment was removed by centrifugation to give a clear, homogeneous liquid. After six weeks of storage at room temperature, the sample remained as a clear liquid which was free of sediment.

One part of the stabilizer composition of this example was blended with 100 parts of polyvinyl chloride resin (Geon. 101), 50 parts diisooctyl phthalate, and 0.5 part stearic acid. The blend was milled for five minutes at 171° (340° F.) on a two-roll mill to give a clear, homogeneous sheet which was substantially colorless. The sheet was subjected to an oven heat stability test at 177° (350° F.) according to ASTM Test D–2115–62T. During this test an initial light yellow color appeared in the sheet at 45 minutes and a red-brown color developed at 60 minutes. In contrast an unstabilized polyvinyl chloride resin turns red-brown or black as it is being milled.

EXAMPLE 7

A mixture of 5.2 parts of the barium salt described in Example 5, 3.2 parts of the cadmium salt described in Example 5, 6.7 parts isooctyl diphenyl phosphite, 6.4 parts naphtha (described in Example 3), 1.0 part alpha, alpha-dimethylbenzylsuccinic anhydride and 2.0 parts nonanoic acid was stirred and heated to a temperature of 150°. An amount of naphtha corresponding to that which had been lost by boiling was added to the resulting solution. Upon cooling to room temperature and standing several hours, the stable, liquid composition had a viscosity higher than desired. For this reason 0.5 part of 2-butoxyethanol was added so that the liquid became quite fluid and easily pourable. After centrifugation to remove a small amount of sediment, and after six weeks of storage at room temperature, the sample remained as a clear liquid which was free of sediment.

EXAMPLE 8

A mixture of 5.2 parts of barium nonylphenoxide, 2.5 parts of the cadmium salt described in Example 5, 5.0 parts triphenyl phosphite, 5.3 parts naphtha (described in Example 3), 1.0 part nonanoic acid and 1.0 part polyanhydride was stirred and heated to 150°, replacing naphtha as it was lost by boiling. The resulting liquid contained a small amount of colorless, transparent gel globules which were removed by filtration. The homogeneous, liquid filtrate was stored in a closed, glass bottle. It remained as a clear liquid, free of sediment, after seven months of storage at room temperature.

The polyanhydride used in this example is a 1:1 copolymer of 1-decene and maleic anhydride, having a molecular weight of approximately 5,000 and containing 20 to 25 anhydride groups in each polymer molecule.

EXAMPLE 9

A mixture of 5.2 parts barium nonylphenoxide, 2.5 parts of the cadmium salt described in Example 5, 5.0 parts isooctyl diphenyl phosphite, 1.0 part polyanhydride (described in Example 8), 1.0 part nonanioc acid and 5.3 parts naphtha was stirred and heated to 160°, replacing naphtha as it was lost by boiling. The resulting liquid contained a small amount of colorless gel globules which were removed by filtration. The homogeneous filtrate remained as a clear liquid, free of sediment, after four months of storage at room temperature. The naphtha used in this example is a petroleum naphtha having a distillation range of 155° to 210° and a composition of 68 percent paraffins, 1.5 percent olefinic hydrocarbons, 24 percent naphthenes and 6.5 percent aromatic hydrocarbons.

EXAMPLE 10

A mixture of 1.5 parts anhydrous barium hydroxide, 4.5 parts nonylphenol and 5.3 parts naphtha (described in Example 3) was heated and stirred until barium nonylphenoxide was formed and the water produced by the reaction had been removed by boiling azeotropically with the naphtha. The naphtha lost by boiling was replaced and to the solution was added a mixture of 2.5 parts of the cadmium salt described in Example 5, 5.0 parts isooctyl diphenyl phosphite, 0.5 part nonanoic acid and 0.5 part methylbicyclo(2.2.1)heptene-2,3-dicarboxylic anhydride (Nadic Methyl Anhydride). The mixture was heated and stirred until a viscous, homogeneous solution was formed which was stable on standing. To lower the viscosity of the composition, 0.5 part 2-butoxyethanol was added so that the liquid became quite fluid and easily pourable. After centrifugation to remove a small amount of sediment, and after four months of storage at room temperature, the sample remained as a clear liquid which was free of sediment.

Although specific examples of the invention have been set forth hereinabove, it is not intended to limit the invention thereto, but to include all of the variations and modifications falling within the scope of the appended claims.

We claim:

1. A liquid storage-stable composition for stabilizing vinyl chloride resin compositions comprising:
(a) from about four to about 40 parts of a barium, cadmium or zinc salt of a linear aliphatic carboxylic acid having from six to 12 carbon atoms or from about four to about 60 parts of a mixture thereof;
(b) from about 10 to about 80 parts of a triorganophosphite having the formula

wherein $R_1$, $R_2$ and $R_3$ independently have from one to 18 carbon atoms and are independently selected from aryl, alkyl, cycloaliphatic and oxygen-carbon heterocyclic;
(c) from about one to about 35 parts of a mono- or dicarboxylic acid having from one to about 20 carbon atoms;
(d) from about one to about 35 parts of a carboxylic acid mono- or polyanhydride; and
(e) from about 15 to about 80 parts of a hydrocarbon solvent, the parts of each component being based on 100 parts of the total stabilizer composition.

2. A liquid storage-stable composition in accordance with claim 1 in which the carboxylic acid has from two to about 10 carbon atoms and $R_1$, $R_2$ and $R_3$ independently have from one to about 10 carbon atoms.

3. A liquid storage-stable composition in accordance with claim 1 in which said anhydride has from two to about nine carbon atoms.

4. A liquid storage-stable composition in accordance with claim 1 in which the triorganophosphite is triphenyl phosphite.

5. A liquid storage-stable composition in accordance with claim 1 in which the triorganophosphite is a diphenyl alkyl phosphite.

6. A liquid storage-stable composition in accordance with claim 2 in which said anhydride has from two to about nine carbon atoms.

7. A heat stabilized vinyl chloride resin composition prepared by mixing from about 0.5 to about 10 parts by weight of the composition of claim 1 with about 100 parts of a vinyl chloride polymer.

References Cited

UNITED STATES PATENTS

| | | | |
|---|---|---|---|
| 2,394,418 | 2/1946 | Quattlebaum et al. | 260—45.85 X |
| 3,501,370 | 3/1970 | Juredine | 260—23 X |
| 2,868,745 | 1/1959 | Canarios | 260—23 |
| 3,347,823 | 10/1967 | Buckley et al. | 260—23 X |
| 3,499,860 | 3/1970 | Penneck | 260—23 |

OTHER REFERENCES

Condensed Chemical Dictionary pp. 218 and 798 (1956).

JAMES A. SEIDLECK, Primary Examiner

D. J. BARRACK, Assistant Examiner

U. S. Cl. X.R.

252—400, 407; 260—33.6 UA, 45.7 P, 45.8 A, 45.85